United States Patent [19]
Stephenson

[11] 3,822,840
[45] July 9, 1974

[54] BELT RETRACTOR WITH SPRING BIASED AUXILIARY RATCHET WHEEL

[75] Inventor: Robert L. Stephenson, Sterling Heights, Mich.

[73] Assignee: Allied Chemical Corporation, New York, N.Y.

[22] Filed: Jan. 8, 1973

[21] Appl. No.: 321,899

[52] U.S. Cl............... 242/99, 242/107.4, 74/575
[51] Int. Cl...................... A62b 35/00, B65h 63/00
[58] Field of Search........... 242/107.4, 107.5, 107.2, 242/107.3, 107.6, 107.7, 107 SB, 107 R, 99; 188/82.7; 74/575, 576, 577 R; 297/386, 387, 388; 280/150 SB

[56] References Cited
UNITED STATES PATENTS
1,082,842  12/1913  Beckwith et al..................... 74/576

Primary Examiner—John W. Huckert
Assistant Examiner—John W. Henry
Attorney, Agent, or Firm—Clayton F. Smith; John P. Kirby, Jr.; Jonathan Plaut

[57] ABSTRACT

A reel-type retractor for a vehicle safety belt having the feature that a spring-biased light-weight ratchet wheel, rotatable within limits with respect to a ratchet wheel serving as a flange for the reel, is biased with its teeth maintained slightly in advance of those of the flange. This light-weight rotatable auxiliary ratchet wheel prevents the pawl from striking the tip of the teeth of the flange and rebounding, to thereby skip teeth. In such a situation, the pawl strikes the advanced tooth of the auxiliary ratchet wheel causing it to give way against its bias. As a result, the pawl will not rebound, but engage the first tooth presented.

6 Claims, 3 Drawing Figures

BELT RETRACTOR WITH SPRING BIASED AUXILIARY RATCHET WHEEL

BACKGROUND OF THE INVENTION

1. Field of the Invention

This invention relates to vehicle safety belt retractors and more particularly to those of the type having a rotatable reel to which a seat belt is attached. Such reel-type seat belt retractors generally have at least one toothed ratchet wheel as a reel flange, and a pawl adapted to engage the ratchet wheel to halt rotation of the reel. The seat belt may be withdrawn for buckling about the occupant of a vehicle, to restrain the individual when conditions require it in the interests of safety.

In many such retractors the pawl is released for engagement with the ratchet at the moment the reel is rapidly accelerating, as when the wearer lurches forward violently in his seat. Such action results when the vehicle is involved in a collision.

Obviously, the pawl should halt the rotation of the rapidly accelerating reel as rapidly as possible.

2. DESCRIPTION OF THE PRIOR ART

Many different ways have been suggested for triggering a biased pawl for engagement with a ratchet wheel in response to conditions arising as a result of a collision, and in most instances the rotation of the reel is halted before any appreciable extension of the restraining safety belt has occurred. There are exceptions, however. Unfortunately, on occasion, the pawl will fall on the tip of a tooth and rebound therefrom, skipping teeth, thereby permitting the extension of more belt than is considered desirable for safe restraint.

SUMMARY OF THE INVENTION

It has now been found that if a second auxiliary ratchet wheel having the same number of teeth and having substantially the same diameter as a first ratchet wheel serving as a reel flange, is co-axially positioned adjacent to this first ratchet wheel, and if the auxiliary wheel is rotatable within limits with respect to the first ratchet wheel, and spring biased to a first position wherein the tip of its teeth are slightly in advance of the tips of the teeth of the first ratchet wheel, and rotatable against its bias to a second position wherein its teeth are substantially in line with those of the first ratchet wheel, then the skipping of more than one tooth under conditions otherwise conducive to tooth skipping, can be averted.

When the pawl strikes the advanced tip of a tooth of the auxiliary ratchet wheel, it causes it to give way against its bias. As a result, the pawl will not rebound, but will engage the first tooth presented.

BRIEF DESCRIPTION OF THE DRAWINGS

The description refers to the accompanying drawings in which like reference characters refer to like parts throughout the several views.

DESCRIPTION OF THE PREFERRED EMBODIMENT

This invention constitutes an improvement in that type of safety belt retractor having a rotatable reel to which a seat belt is attached, said reel having at least one toothed ratchet wheel to halt rotation of the reel. The improvement comprises a second ratchet wheel adjacent to the first for engagement with the pawl, said second ratchet wheel having limited axial rotation with respect to the first ratchet wheel. Biasing means urge the second ratchet wheel in a direction with respect to the first such that the teeth are normally maintained just forward of corresponding teeth on the first ratchet wheel. The teeth of the second ratchet wheel when engaged by the pawl rotate the ratchet wheel against its bias until the teeth of the second ratchet wheel are substantially in line with the teeth of the first.

Figure 1:
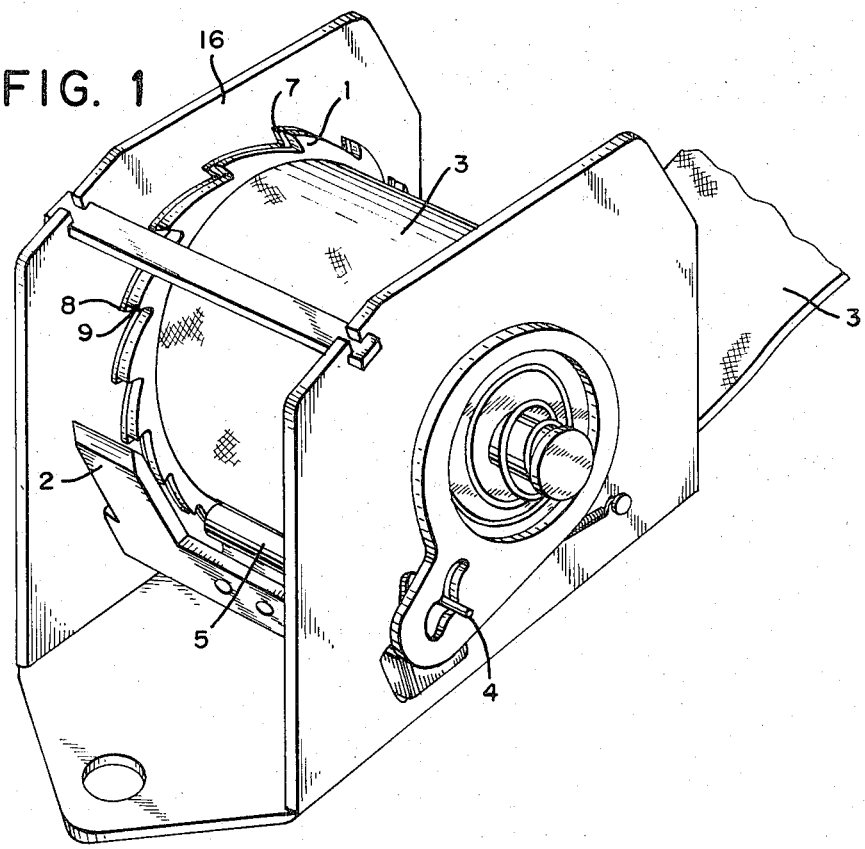
FIG. 1 is a perspective view of a typical seat belt retractor showing the position of the auxiliary second ratchet wheel adjacent to a first ratchet wheel which also serves as a flange of the seat belt reel.

A better understanding of the arrangement of the ratchet wheels and their action can be had by reference to the accompanying drawings:

FIG. 1 represents a typical seat belt retractor having reel flange 1, with ratchet teeth for engagement with pawl 2. Belt 3 is shown wound on the reel and the pawl bar is held in its unlocked position both by cam and cam follower 4 and webbing follower 5. Flange 1 is fixed to axle 6 (FIGS. 2 and 3) but auxiliary ratchet wheel 7, adjacent to flange 1, is free to turn with respect to the reel and reel flange, to a limited degree. It is biased to the position shown with the tips of its teeth 8 slightly in advance of the teeth 9 of ratchet wheel (flange) 1. This represents the forward limit of rotation of auxiliary ratchet wheel 7. The rearward limit of rotation of ratchet wheel 7 against its bias is unimportant as long as it is sufficient to allow substantial alignment of the teeth of the adjacent ratchet wheels. By "forward," I mean in a rotational direction for locking engagement of the ratchet wheels with the pawl, and for extension of the belt. By "rearward," I mean the rotational direction for retracting the belt on the reel.

If the auxiliary ratchet wheel 7 were omitted, it can be seen that pawl 2 could strike tip 9 of a tooth on ratchet wheel 1. These tips are ordinarily somewhat rounded, and pawl 2 could rebound from this tip sufficiently to skip one or more teeth as the reel rapidly revolves.

Figure 2:
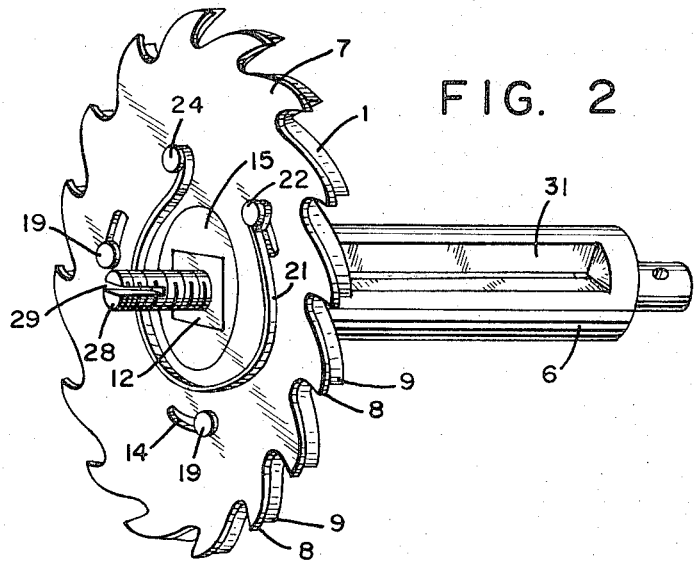
FIG. 2 is a perspective view of the reel assembly. The first ratchet wheel is shown fixed to the axle of the reel with the auxiliary second ratchet wheel axially arranged with respect to the first for limited rotation. Also included in the reel assembly is a spring anchored to the first ratchet wheel biasing the auxiliary ratchet wheel to the limit permitted by the concentrically arranged slots, and the cooperating pins extending therein from the first ratchet wheel to which they are affixed. "Slots" are to be understood to also include concentrically arranged elongated indentations or channels in the surface of the auxiliary ratchet wheel.

It can be seen in FIGS. 1 and 2 that with auxiliary ratchet wheel 7 biased to a position wherein its teeth are slightly in advance of those of ratchet wheel 1, the pawl could not strike the tip of a tooth 9 of ratchet wheel 1 but instead would strike the substantially flat outer surface offered by a tooth 8 of auxiliary ratchet wheel 7. Experience has shown that the pawl will not rebound to skip teeth under this circumstance. If the pawl 2 strikes the tip of a tooth 8 of auxiliary ratchet wheel 7, the latter gives way against its bias and surprisingly, the pawl will not rebound but will engage the first tooth of ratchet wheel 1, presented.

This action is most effective when auxiliary ratchet wheel 7 is lighter in weight than ratchet wheel 1. This relationship can be achieved by selecting a lighter weight material of construction for ratchet wheel 7 than that used for constructing ratchet wheel 1. Preferably, both ratchet wheels are constructed of the same material but auxiliary ratchet wheel 7 is made thinner than ratchet wheel 1. Good results are obtained if the auxiliary ratchet wheel 7 has about half the thickness of ratchet wheel 1.

The amount by which the tips of the teeth of auxiliary ratchet wheel 7 are biased to extend beyond the tips of the teeth of ratchet wheel 1 is not critical, but preferably it is less than one third the distance between the tips of two adjacent teeth on one of the ratchet wheels. Both ratchet wheels have the same number of teeth and are substantially of equal diameter.

It is also preferable that the tips of the teeth 8 of auxiliary ratchet wheel 7 are not appreciably rounded but have substantially sharp tips to minimize the angle of rotation between the point where the pawl could just miss the tip of a tooth and where it could just strike it.

FIG. 2 is a perspective drawing of the ratchet wheel assembly on the axle of the reel. In this embodiment, axle 6 has a rectangular end 12 for firmly attaching ratchet wheel 1. This ratchet wheel also constitutes a reel flange, the only flange used in this particular type of retractor.

Further particulars on this type of retractor can be found in copending U.S. Pat. application, Ser. No. 269,349, filed July 6, 1972, titled, "Electromagnetically Controlled Safety Belt Retractor."

Figure 3:
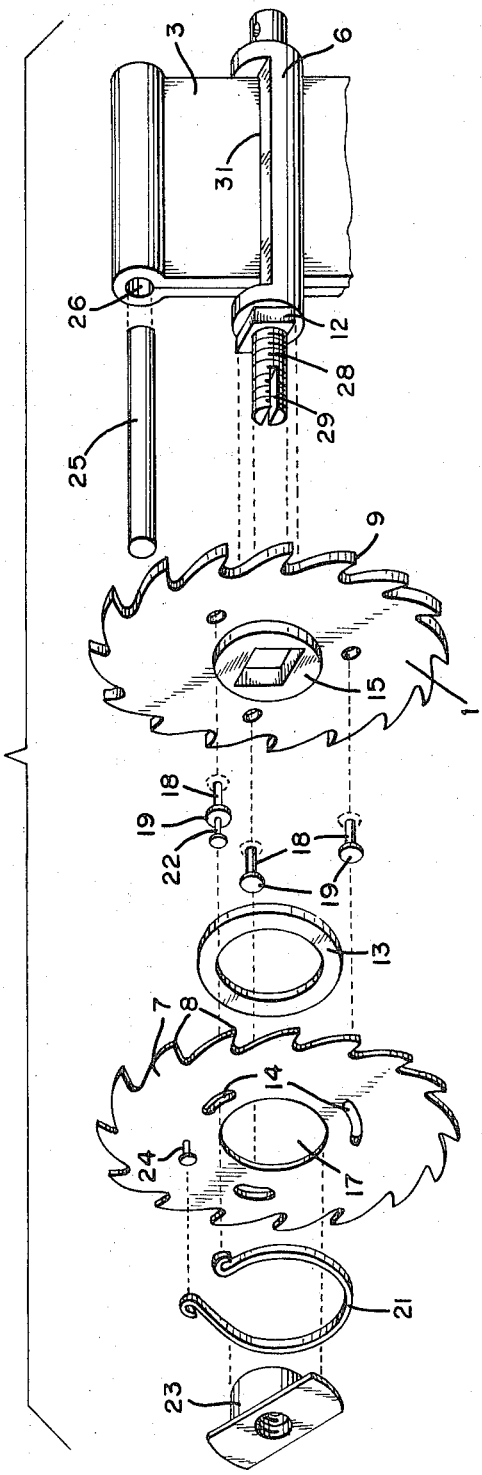
FIG. 3 is an exploded view of the reel assembly of FIG. 2 in perspective. The method of attaching the belt in this particular type of retractor is also shown.

Ratchet wheels 1 and 7 are separated by a thin washer 13 (FIG. 3). In this embodiment, ratchet wheel 1 has concentrically arranged pins which extend from its surface. By "pins" I mean any concentrically positioned members extending from the surface of ratchet wheel 1 on the side facing the reel support wall 16 (FIG. 1). These pins may be attached to ratchet wheel 1 or they may constitute rivets-like members as shown. These pins slideably engage corresponding concentrically arranged slots 14 in auxiliary ratchet wheel 7. These slots permit limited axial rotation of auxiliary ratchet wheel 7 with respect to ratchet wheel 1, from a first position wherein the tips of the teeth 8 of ratchet wheel 7 are slightly in advance of the tips 9 of the teeth of ratchet wheel 1 to a second position wherein the teeth of both ratchet wheels are substantially in line. The slots may permit the teeth of auxiliary ratchet wheel 7 to move some distance to the rear of those of ratchet wheel 1 for this second position but is not critical as long as the teeth of auxiliary ratchet wheel 7 can at least rotate to a point where they are in line with those of ratchet wheel 1.

Opening 17 (FIG. 3) is rotatably positioned on hub 15 but separated from ratchet wheel 1 by washer 13 which is preferably fabricated of material having lubricating properties such as nylon or Teflon. Pins 18 extend through slots 14 and preferably hold it rotatably in place by virtue of their heads 19.

Spring 21 is indirectly connected to ratchet wheel 1 by attachment to extension 22 of pin or rivet 19 extending through slot 14. With this arrangement, spring 21 becomes contiguous with auxiliary ratchet wheel 7 and lies between this ratchet wheel and support wall 16. Space for its operation is insured by adjustment of bearing 23 (FIG. 3).

The other end of the horseshoe-shaped spring 21 is attached to extending member 24 on the support wall side of ratchet wheel 7 and exerts in this instance a bias in a direction to close the "horseshoe" and therefore in a direction to extend the teeth of ratchet wheel 7 beyond those of ratchet wheel 1. Any force exerted on these extending tips 8 of the teeth of ratchet wheel 7 will cause the horseshoe-configured spring to open and to press these teeth rearward against the bias of the spring until the teeth are in line with the teeth of ratchet wheel 1.

FIG. 3 is an exploded view in perspective of the assembly of FIG. 2 and also illustrates the method of attaching the safety belt 3 in this typical retractor. Pin 25 is inserted into loop 26 of belt 3 and the loop is then drawn down into elongated funnel-shaped slot 31 where the loop can be retained beneath the surface of reel axle 6.

It can be seen that in this embodiment the rectangular end 12 of axle 6 is inserted into the corresponding opening 27 in ratchet wheel and hub 1 and 15, thus integrating the ratchet wheel with the axel for service as a reel flange.

When slotted screw 28 is inserted into the corresponding opening in support wall 16, bearing 23 is screwed on it with the slotted position of the screw extending outside the support wall. The bearing is adjusted to leave sufficient room between the auxiliary ratchet wheel and the inner surface of the support wall 16 for the spring and pins 21 and 19. The bearing 23 is thereby journaled in the support wall for rotation and slot 29 becomes available for the attachment of the main retractor spring, not shown. (See reference previously given, U.S. Ser. No. 269,349).

In a retractor representing the preferred embodiment of my invention, the ratchet wheel 1, which also serves as a reel flange, has a thickness of 0.08 inch. The hub 15 extends from the surface of the ratchet wheel ⅛ inch and is ¾ inch in diameter. The washer 13 is fabricated of nylon. It is 1 inch in diameter and has an opening to slip over the ¾ inch hub 15. Concentrically arranged slots 14 in the auxiliary ratchet wheel are three in number, and are 0.06 inch wide and ¼ inch long. The teeth in this wheel which is 0.04 inch thick are cut back to provide a sharp leading edge. The spring providing the bias is 0.05 inch in diameter.

Many modifications or variations of the present invention are possible in the light of the above teachings. It is, therefore, to be understood that within the scope of the appendant claims, the invention may be practiced otherwise than as specifically described.

I claim:

1. In a safety belt retractor having a rotatable reel to which a seat belt is attached, said reel having as a flange at least one first ratchet wheel having ratchet teeth including tips, and a pawl adapted to engage the first ratchet wheel to halt rotation of the reel, the improvement which comprises a second ratchet wheel mounted adjacent to the first ratchet wheel, for axial rotation relative to the first ratchet wheel the second ratchet wheel having ratchet teeth including tips for engagement with the pawl, means for limiting the relative axial rotation between the first and second ratchet wheels, biasing means acting between the first and second ratchet wheels urging the second ratchet wheel to a first rotational position with respect to the first ratchet wheel such that the tips of the teeth of the second ratchet wheel are normally maintained a circumferential distance in advance, in the belt unwinding direction, of corresponding tips of adjacent teeth on the first ratchet wheel, said advance circumferential distance being a small portion of the total circumferential distance separating the tips of successive teeth of the first ratchet wheel; whereby the second ratchet wheel, when engaged by the pawl, rotates against bias provided by said biasing means to a second rotational position wherein the tips of the teeth of the second ratchet wheel are substantially in line with the tips of adjacent teeth of the first ratchet wheel.

2. The safety belt retractor as claimed in claim 1 wherein said means for limiting relative axial rotation comprises: at least one pin attached to one ratchet wheel and at least one slot in the adjacent ratchet wheel, said pin engaging said slot, said slot having sufficient length along a line concentric to the axis of rotation to limit the rotation of the second ratchet wheel from the first rotational position to the second rotational position, and said biasing means is a spring acting between both ratchet wheels to bias them toward the first rotational position.

3. The safety belt retractor as claimed in claim 2 wherein between two and four said pins extend from the surface of the first ratchet wheel and wherein the second ratchet wheel has a number of said slots corresponding to the number of said pins, said slots being elongated, said pins being adapted to cooperate with said elongated slots positioned along lines concentric to the point of rotation of the second ratchet wheel, and sized to limit the rotation of the second ratchet wheel to the first position and the second position.

4. The safety belt retractor as claimed in claim 3 wherein the tips of the teeth of the second ratchet wheel in the first position extend beyond the tips of the teeth of the first ratchet wheel in the belt unwinding direction by an amount less than one-third of the distance between the tips of the teeth on the ratchet wheel.

5. The safety belt retractor as claimed in claim 1 wherein the weight of the second ratchet wheel is less than the weight of the first ratchet wheel.

6. The safety belt retractor as claimed in claim 5 wherein the weight of the second ratchet wheel is between ¼ and ¾ of the weight of the first ratchet wheel.

* * * * *